April 7, 1953
P. C. COFIELD
2,633,784
PHOTOGRAPHIC PRINTER
Filed Aug. 26, 1949
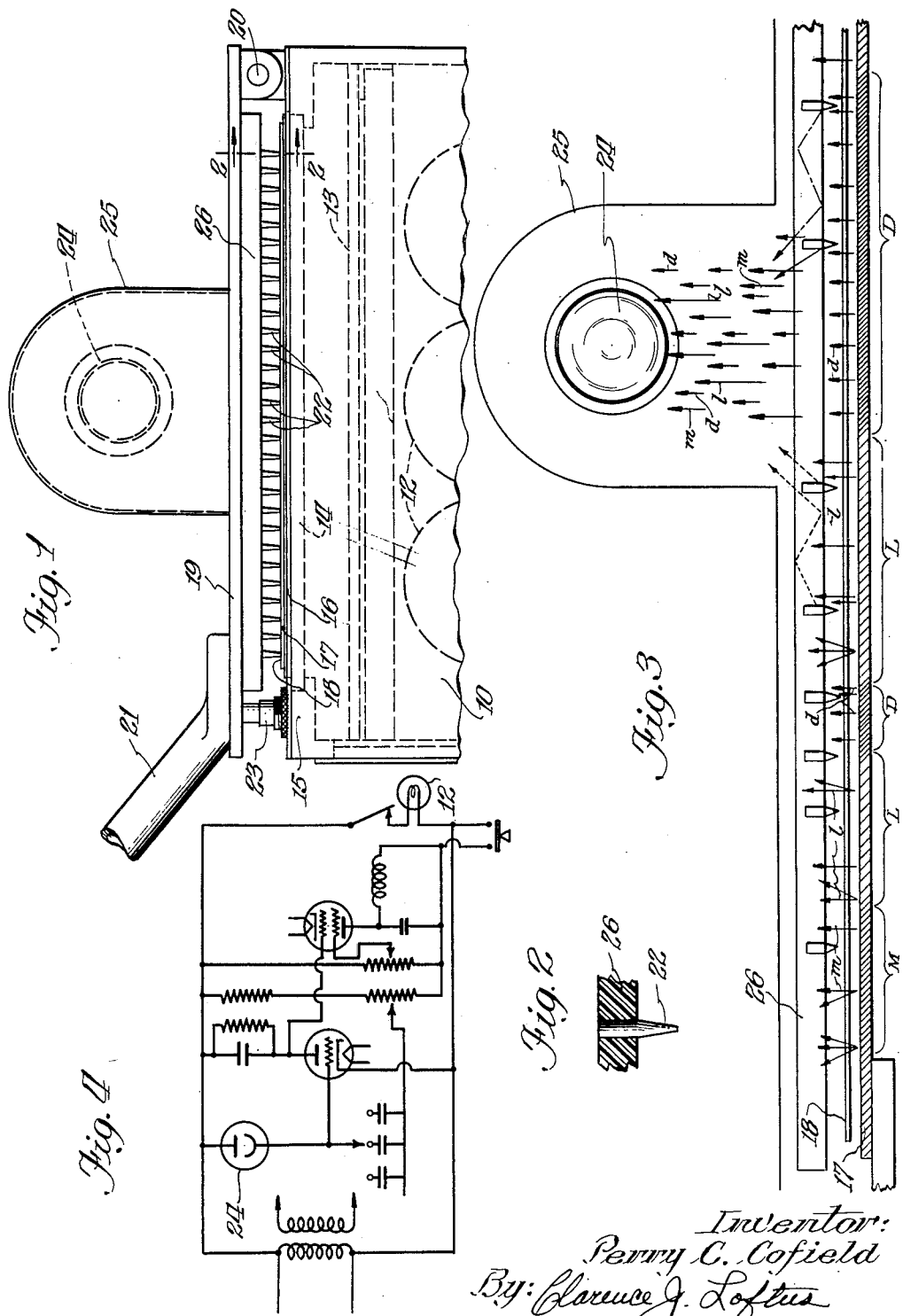
Inventor:
Perry C. Cofield
By: Clarence J. Loftus
Attorney.

Patented Apr. 7, 1953

2,633,784

UNITED STATES PATENT OFFICE 2,633,784

PHOTOGRAPHIC PRINTER

Perry C. Cofield, Key West, Fla.

Application August 26, 1949, Serial No. 112,604

1 Claim. (Cl. 95—73)

This invention relates to the making of photographic prints, and has as its general aim the provision of means for automatically calculating the proper exposure as the print is being made.

It has been previously proposed to provide a photo-electric cell to measure the intensity of light passing through a negative and to provide automatic timing devices to energize the light source for a measured time interval calculated according to the density of the negative from which the print is being made. This has not been entirely successful in actual practice, however, unless the negatives are of quite uniform density throughout their area, and experience has shown that negatives having pronounced light or dark areas are more often than not improperly exposed. This is probably due to the fact that in exposure calculating printers of the types heretofore developed, the photo-electric cell utilized to effect the light measurement may receive its light primarily through a small area which may be lighter or darker than the total average density of the entire negative. The result of such a circumstance is to cause an exposure which, while possibly proper for the small area from which the light sample was received, may be far from the optimum exposure required for the negative as a whole.

It is, accordingly, the primary object of the present invention to provide an exposure calculating photographic printer including means for obtaining a measure of the light density of the negative from which the print is being made, with means for timing the exposure of the print in accordance with an average density of the negative, rather than in accordance with the density of any given portion thereof.

A further aim of the invention is to accomplish this object by relatively simple, inexpensive and readily available means, so that the advantages of the present teaching may be utilized without resort to unnecessarily delicate, complex or expensive structures.

The manner in which the above objects are accomplished is best illustrated in connection with the drawings of the present specification, wherein:

Figure 1 is a fragmental side elevational view of a photographic printer constructed in accordance with these teachings;

Figure 2 is a detail sectional view taken substantially on the plane of the line 2—2 of Figure 1, and showing the preferred mounting of the flexible print holding fingers employed in the device;

Figure 3 is an enlarged diagrammatic illustration of the functioning of the devices employed for measuring the total average density of a negative being printed; and Figure 4 is a schematic diagram of an electronic timing circuit suitable for use in the device.

The printer comprises in general a rectangular lamp housing 10, in which one or more incandescent lamp bulbs 12 are mounted. The housing is closed at the bottom and sides, but is provided with a diffusing plate 13 and a window 14, which may be a piece of plate glass, at the top, so that the window 14 with the opaque marginal frame members 15 provide a printing frame upon which photographic negatives and printing paper may be placed. Ordinarily the printing frame may be provided with an opaque mask 16 having a central aperture corresponding in size to the size of negatives being printed, so that by changing masks the device may be suited to printing any size of negative up to the maximum dimensions of the plate glass 14. The negative 17 may be laid flat upon the mask 16 and covered with a piece of sensitized printing paper 18 having its light sensitive surface downwardly disposed against the negative, so that it will be illuminated by light passing upwardly through the window 14 from the incandescent lamps 12. The sensitized paper and negative are held flat against the surface of the plate glass 14 by a cover 19, which, as shown, is hinged to the housing 10 by a pivot rod 20 and provided with a manually operable handle 21 to enable the operator to raise and lower the cover as required. The cover is preferably provided with means to hold the negative and printing paper flat on the printing frame. As shown, a multiplicity of resilient rubber fingers 22 are employed for this purpose, and in the illustrated embodiment of the invention these may be seated in small apertures drilled in the plate 26 described hereinafter (Figure 2).

The housing 10 carries an electrical switch 23 of the push button type, so arranged that an electrical circuit through the incandescent lamps 12 is closed when the operator brings the cover 19 of the printer down against the prints in the position illustrated in Figure 1. Thus, when a negative and piece of printing paper are placed in position, it is only necessary for the operator to lower the cover; the light sources will be energized automatically to initiate the exposure of the print. The time of exposure is calculated by an electronic circuit governed by a photoelectric cell 24 provided in a housing 25 in the cover 19. The housing 25 is open at the bottom so that the cell 24 will be energized by light coming from the incandescent lamps 12 and passing through both the negative 17 and the printing paper 18. Any suitable calculating circuit may be employed to time the exposure. Good results have been obtained by the circuit illustrated in Figure 4, but since other circuits may be employed, it is believed unnecessary to describe the circuit operation in detail.

As heretofore stated, it is a primary object of the present invention to provide a means whereby the exposure of the print is calculated in accordance with an average density of some small given portion thereof. This is accomplished by the provision of what may be termed an "edge lighting" plate formed of an acrylic resin plastic having peculiar characteristics of light transmission and internal reflection usually referred to as "light piping" or "bifringing." This characteristic is said to be present in fused quartz and is a peculiar characteristic of polymethyl methacrylate, commonly sold under the trade names of "Lucite" and "Plexiglas."

In accordance with the applicant's teaching, an average density of the negative is measured by providing an edge lighting plate 26 of polymethyl methacrylate plastic extending across the entire area of the window 14 of the printing frame. The thickness of the plate may be varied within limits, but excellent results have been obtained by the use of a plate ¼" thick for sizes up to 10" x 10".

The manner in which the apparatus functions is diagrammatically illustrated in Figure 3. The density variations in any negative may be many and varied, but for purposes of explanation we may say that a given negative 17 will have light areas L, dark areas D, and medium areas M. When such a negative is exposed to light coming from below, the dark areas will pass comparatively little light (as indicated by the short arrows $d$), while the medium and light areas will pass proportionately greater amounts of light (as indicated by the longer arrows $m$ and $l$, respectively). In prior devices it is believed that this has often resulted in erroneous exposure calculation, since if, as illustrated in Figure 3, a fairly large area, either lighter or darker than the total average of the print, is adjacent the photoelectric cell, the reading of the cell will be determined primarily on the basis of a small portion of the negative, rather than the whole, and the reading may be correspondingly erroneous.

According to applicant's teaching, however, all of the light passing through the negative and through the printing paper to plate 26 travels in a pattern along the lines hereinafter described. Substantially all of the light rays beneath the opening in housing 25 pass directly upwardly through the plate 26 to the photoelectric cell 24. Due to the plurality of apertures substantially uniformly distributed in plate 26, these apertures being for the reception of fingers 22, some of the light rays that strike plate 26 throughout its area are dispersed or diffused and some of the rays, other than those beneath the housing opening, pass to the cell 24 as a result of dispersion and diffusion, an example or two of the pattern being illustrated in Fig. 3 of the drawing. In other words, due to dispersion and diffusion of light rays around the openings in plate 26, it is possible to read the density of the negative in places other than directly opposite the opening to the photoelectric cell. Thus the light that is transmitted upwardly into the housing 25 and to the photocell 24 will be a function of the density of the negative, and it follows that when the photocell 24 is used to control the electronic circuit governing the lamps 12, it will limit the time of exposure by a calculation made accurately, and by an average reading, even while the exposure is actually in progress.

From the foregoing it will be seen that by applicant's teaching, the shortcomings of prior exposure calculators is avoided and means are provided for regulating the exposure on the basis of an average density of the negative rather than on the density of any given sample portion thereof. This result is accomplished, however, by a structure that is extremely simple, inexpensive and capable of functioning without any special attention or unusual care.

Having thus described my invention, what I claim as new and desire to secure by United States Letters Patent is:

An automatic exposure calculating photographic printer comprising a housing, one side of said housing being open and formed to provide a frame upon which a negative and printing paper thereabove are positioned, a pivoted opaque member extending the length of said side exterior of said housing, an opening in said member, a closure covering said opening on the opposite side of said member from the side of the negative and printing paper, light measuring means in said closure, a sheet of polymethyl methacrylate plastic between said member and paper at said opening, and a series of openings substantially uniformly distributed over the surface of said sheet adjacent the printing paper whereby the light rays passing through said negative and paper into said plastic sheet may be measured by said light measuring means to obtain a measure of the light density of said negative, and means depending from said series of openings for holding the negative and paper in position on said frame.

PERRY C. COFIELD.

REFERENCES CITED

The following references are of record in the file of this patent:

UNITED STATES PATENTS

| Number | Name | Date |
|---|---|---|
| 1,954,338 | Tuttle et al. | Apr. 10, 1934 |
| 1,973,469 | Denis | Sept. 11, 1934 |
| 2,196,166 | Bryce | Apr. 2, 1940 |
| 2,238,762 | Whitaker | Apr. 15, 1941 |
| 2,256,595 | Metcalf | Sept. 23, 1941 |

FOREIGN PATENTS

| Number | Country | Date |
|---|---|---|
| 391,229 | Great Britain | Apr. 27, 1933 |